United States Patent
Ho et al.

(10) Patent No.: US 7,020,822 B2
(45) Date of Patent: Mar. 28, 2006

(54) AUTOMATIC REPEAT REQUEST FOR CENTRALIZED CHANNEL ACCESS

(75) Inventors: Jin-Meng Ho, Plano, TX (US); Donald P. Shaver, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 449 days.

(21) Appl. No.: 10/192,465

(22) Filed: Jul. 10, 2002

(65) Prior Publication Data

US 2003/0079169 A1    Apr. 24, 2003

Related U.S. Application Data

(60) Provisional application No. 60/367,210, filed on Mar. 26, 2002, provisional application No. 60/309,682, filed on Aug. 2, 2001.

(51) Int. Cl.
*G08C 25/02* (2006.01)

(52) U.S. Cl. ............. 714/748; 714/749; 370/394; 370/355

(58) Field of Classification Search ............ 714/748, 714/749; 370/236, 394, 242, 310, 473, 235
See application file for complete search history.

(56) References Cited

U.S. PATENT DOCUMENTS

| | | | | |
|---|---|---|---|---|
| 5,699,367 A | * | 12/1997 | Haartsen | 371/33 |
| 5,701,298 A | * | 12/1997 | Diachina et al. | 370/346 |
| 5,799,012 A | * | 8/1998 | Ayerst et al. | 370/336 |
| 6,160,804 A | * | 12/2000 | Ahmed et al. | 370/349 |
| 6,335,933 B1 | * | 1/2002 | Mallory | 370/394 |
| 6,615,382 B1 | * | 9/2003 | Kang et al. | 714/748 |
| 6,658,005 B1 | * | 12/2003 | Seidel et al. | 370/394 |
| 6,658,619 B1 | * | 12/2003 | Chen | 714/748 |
| 6,700,867 B1 | * | 3/2004 | Classon et al. | 370/216 |

(Continued)

FOREIGN PATENT DOCUMENTS

JP          404111553 A   *   4/1992

OTHER PUBLICATIONS

An Improved Selective-Repeat ARQ StrategyWeldon, E., Jr.;Communications, IEEE Transactions on [legacy, pre—1988]vol. 30, Issue 3, Mar. 1982 Page(s):480-486 □□ □□ AbstractPlus | Full Text: PDF(680 KB) IEEE JNL□□□□.*

(Continued)

*Primary Examiner*—Albert Decady
*Assistant Examiner*—Fritz Alphonse
(74) *Attorney, Agent, or Firm*—Abdul Zindani; W. James Brady, III; Frederick J. Telecky, Jr.

(57) ABSTRACT

A method of providing an automatic repeat request (ARQ) that employs a selective repeat, enabling a transmitting medium access control (MAC) entity at a transmitting station to retransmit those MAC data whose previous transmissions have failed is described. The MAC data is organized into fixed-sized ARQ blocks, with said ARQ blocks being the building blocks of MAC service data units (MSDUs) or MSDU fragments; The transmitting MAC entity assigns a local number and a global number to each ARQ block to be transmitted and identifies ARQ blocks contained in a transmitted MAC protocol data unit (MPDU) by including into the MPDU the local and global numbers of the first ARQ block in that MPDU. A receiving MAC entity at a receiving station determines and acknowledges the reception status of the ARQ blocks received or anticipated.

30 Claims, 3 Drawing Sheets

U.S. PATENT DOCUMENTS

| | | | |
|---|---|---|---|
| 6,778,501 B1* | 8/2004 | Malmgren et al. | 370/236 |
| 2002/0071407 A1* | 6/2002 | Koo et al. | 370/335 |
| 2002/0172208 A1* | 11/2002 | Malkamaki | 370/400 |
| 2003/0103459 A1* | 6/2003 | Connors et al. | 370/235 |

OTHER PUBLICATIONS

Automatic-repeat-request error-control schemesShu Lin; Costello, D.; Miller, M.;Communications Magazine, IEEEvol. 22, Issue 12, Dec. 1984 Page(s):5-17 □□ □□ AbstractPlus | Full Text: PDF(2928 KB) IEEE JNL.*

ARQ systems Information Theory, 1988. Abstracts of Papers., 1988 IEEE International Symposium onJun. 19-24, 1988 Page(s):135-137 Digital Object Identifier 10.1109/ISIT.1988.22277 □□ □□AbstractPlus | Full Text: PDF(128 KB) IEEE CNF□□□□.*

* cited by examiner

AUTOMATIC REPEAT REQUEST FOR CENTRALIZED CHANNEL ACCESS

PRIORITY CLAIM

This application is related to and claims priority from the U.S. Provisional Patent Application Ser. No. 60/309,682, filed on Aug. 02, 2001, and the U.S. Provisional Patent Application Ser. No. 60/367,210, filed on Mar. 26, 2002 which are incorporated herein by reference in its entirety for all purposes.

FIELD OF INVENTION

This invention relates to wireless communication systems such as point-to-point, point-to-multipoint, and multipoint-to-multipoint communication systems and more particularly to automatic repeat request for centralized channel access.

BACKGROUND OF INVENTION

In a centralized channel access system a number of users share a common channel and there is some coordination control to determine which user is going to use the system. A centralized channel access system has a central device to determine the user that has access. In wireless communications data may not be received for one or more reasons such a nearby jamming signal, noisy signal, low power transmission, etc. Hardware and software standards are provided that govern the transmission between two stations. On local area networks (LANs) data link protocols such as Token Ring, and FDDI provide the access control method (OSI layers 1 and 2) that moves packets from station to station. Some means needs to be provided to notify transmitter when data is lost. The data link protocol is a hand shaking operation with message exchanges such as "are you there?" "yes, I am", "are you ready to receive?", "yes, I am", "Here it comes" plus data and "did you get it", if the receiver did not the response "no, I didn't", "Here it comes again" plus data and "did you get it", if yes then "yes, I did", "There is no more", and then "goodbye". Some systems may provide a negative acknowledgment that the data was lost and send that back to the transmitter. Other systems may send back a positive statement indicating what was received and nothing if it was not received.

FIG. 1 illustrates a communication system with the protocol layers. The system includes point or multipoint transceiver(s) 11 communicating with a point or multipoint transceiver(s) 13 via a wireless network including antennas 11a and 13a. Each point or multipoint 11 or 13 have at the bottom layer the physical (PHY) layer coupled to the antennas. Above the physical layer is the medium access control (MAC) sublayer. Above the MAC sublayer is a logical link control (LLC) sublayer. In the operation a series of LLC frames are passed down to a MAC sublayer as MAC service data units (MSDUs) and from the MAC sublayer to the PHY layer as MAC protocol data units (MPDUs). The MAC sublayer determines if each frame is transmitted correctly. The reception at the opposite end such as at receiver 13 the signals travel up the stack from the PHY layer to the MAC sublayer to the LLC sublayer.

The central controller may not allow the user to occupy the channel for so long as to transmit a whole MSDU so an MSDU may have to be divided into pieces of fragments, each of which is then transmitted as a separate MPDU when access is permitted. Another reason to break up into fragments is to maximize the successful transmission probability. A long packet suffers more if there are channel impairments such as noise or other interference because there is a greater chance of affecting the message. It is the responsibility of the MAC to do the fragmentation. As illustrated in FIG. 2 two numbers are needed to identify an MSDU fragment, a number for identifying the fragment out of all the fragments of the MSDU and a number for identifying the MSDU out of a series of MSDUs. An MSDU may be decomposed into a variable number of fragments. The transmitting station sends out fragments to the receiving station and fragments may be refragmented again or combined for retransmission if they were not successfully transmitted. The present invention provides a means of enabling the transmitting station to label, and the receiving station to acknowledge, the transmitted fragments, so that lost fragments can be identified and retransmitted to achieve communications reliability over an unreliable channel. Such a means is referred to as automatic repeat request. i.e., ARQ. This present application teaches an improvement for the ARQ described in IEEE 802.16ab-01/01, incorporated herein by reference.

SUMMARY OF INVENTION

In accordance with one embodiment of the present invention an automatic repeat request (ARQ) scheme is provided that employs a selective repeat, enabling the transmitting medium access control (MAC) entity to retransmit those MAC data whose previous transmissions have failed. This ARQ scheme organizes MAC data into fixed-size ARQ blocks, with such blocks serving as the building blocks of MAC service data units (MSDUs) or MSDU fragments. The transmitting MAC assigns a local number and a global number to each ARQ block to be transmitted, and thus identifies an MSDU or MSDU fragment by including into that MSDU or MSDU fragment the local and global numbers of the first ARQ block contained in that MSDU or MSDU fragment. The receiving MAC can then determine, and acknowledge, the reception status of the ARQ blocks received or anticipated. The receiving station piggybacks the acknowledgment into other data going to the transmitting station, or sends the acknowledgment alone back to the transmitting station.

In accordance with an embodiment of the present invention the local number is local to the ARQ blocks comprising a given MSDU, while the global number is global to the ARQ blocks across MSDUs. Fragments are constructed out of adjacent ARQ blocks, and may be of different sizes. A fragment needs to include expressly only the local number and the global number of the first ARQ block in it for an unambiguous identification of all the ARQ blocks in it.

DESCRIPTION OF PREFERRED EMBODIMENTS OF THE PRESENT INVENTION

Figure 1:
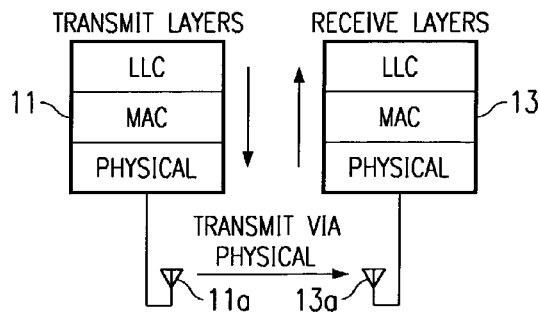
FIG. 1 illustrates a communication system with protocol layers.
Figure 2:
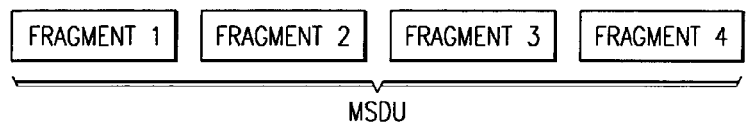
FIG. 2 illustrates MSDUs and fragments.

The automatic repeat request (ARQ) system described herein employs selective repeat, enabling the transmitting mediun access control (MAC) sublayer to retransmit those MAC data whose previous transmissions have failed. Common MAC standards are the CSMA/CD architecture used in Ethernet and various token passing methods such as those used in Token Ring, FDDI and MAP. The ARQ scheme described herein organizes MAC data into fixed-size ARQ blocks, with such blocks serving as the building blocks of MAC service data units (MSDUs) or MSDU fragments. In order to retransmit the ARQ blocks in a failed MPDU the system needs to know which MPDU among all previously transmitted MPDUs. The transmitting MAC assigns a local number and a global number to each ARQ block to be transmitted, and thus identifies ARQ blocks contained in a transmitted MPDU by including into the MPDU the local and global numbers of the first ARQ block in that MPDU, so that the receiving MAC can determine, and acknowledge, the reception status of the ARQ blocks received or anticipated. The receiving station piggybacks the acknowledgment into other data going to the transmitting station, or sends the acknowledgment alone back to the transmitting station.

In accordance with an embodiment of the present invention the local number is local to the ARQ blocks within the MSDU, while the global number is global to the ARQ blocks across MSDUs. Fragments are constructed out of adjacent ARQ blocks, and may be of different sizes. A fragment needs to include expressly only the local number and the global number of the first ARQ block in it for an unambiguous identification of all the ARQ blocks in it. For ARQ purposes, the FC and FSN fields defined as part of a subheader on a per fragment basis in proposed standard P802.16/D4 are, with a modification in their lengths and names, suitable for containing these two numbers, dispensing with the need for creating additional numbering fields within each fragment. The ARQ numbering subfields are part of new ARQ related subheaders.

In addition to the definition of ARQ blocks, other ARQ related parameters are also defined for the correct operation at the transmitter and receiver when ARQ is enabled. A sliding window is needed on account of both transmitter and receiver buffer limits. An acknowledgment time-out is used in activating a retransmission of an unacknowledged frame. An ARQ lifetime is set to prevent the transmitter from having endless retransmissions of an ARQ block for which an acknowledgment is never returned by the receiver for some reasons, and thus from blocking the transmission of other buffered ARQ blocks; and to prevent the receiver from sending endless negative acknowledgments for an ARQ block that has been discarded by the transmitter, and thus from excessively delaying the delivery of received ARQ blocks to the higher layer.

The local and global numbers identifying the first ARQ block of a fragment shall be contained in the ARQ Local Number (ALN) and the ARQ Global Number (AGN) fields of new ARQ related subheaders as defined in Tables ARQ.1 and ARQ.2. These new subheaders are coded with some of the types reserved in Tables 4 and 5 of proposed standard P802.16/D4, where the FC and FSN fields are the counterparts of the ALN and AGN fields. The type is identified by the type field in the generic MAC header. MAC protocol data units (MPDUs) belonging to one of these new types shall contain a CRC field.

An MPDU of type 0x0A or 0x0B contains one or more ARQ acknowledgment subheaders but not other subheaders nor MAC payload. All other MPDUs, which contain one or more MSDUs (or fragments thereof), include at most one ARQ acknowledgment subheader. This is to reduce the impact of the loss of multiple ARQ acknowledgment subheaders, since longer MPDUs are more likely to encounter transmission errors and hence to result in the loss of the ARQ acknowledgment subheaders they contain. Such a loss would result in the retransmission or drop of a large amount of traffic. An MPDU may contain different subheaders and associated payloads (if appropriate), in the combinations and orders defined in Table ARQ.1.

TABLE ARQ.1

ARQ Related Type Encoding

| Type | Description |
|---|---|
| 0x06 | ARQ packing subheaders present |
| 0x07 | Grant management subheader and ARQ packing subheaders present (uplink only) |
| 0x08 | ARQ fragmentation subheader present |
| 0x09 | Grant management subheader and ARQ fragmentation subheader present (uplink only) |
| 0x0A | ARQ acknowledgment subheader(s) present |
| 0x0B | Grant management subheader and ARQ acknowledgment subheader(s) present (uplink only) |
| 0x0C | ARQ acknowledgment subheader and ARQ packing subheaders present |
| 0x0D | Grant management subheader, ARQ acknowledgment subheader, and ARQ packing subheaders present (uplink only) |
| 0x0E | ARQ acknowledgment subheader and ARQ fragmentation subheader present |
| 0x0F | Grant management subheader, ARQ acknowledgment subheader, and ARQ fragmentation subheader present (uplink only) |

The encoding of these ARQ related subheaders, in a C-like style, are given in Tables ARQ.2–ARQ.7.

TABLE ARQ.2

ARQ Fragmentation Subheader Format

| Syntax | Size | Notes |
|---|---|---|
| ARQ fragmentation sub-header (){ | | |
| FSF | 1 bit | FSF: Final or Sole Fragment |
| ALN | 3 bits | ALN: ARQ Local Number |
| AGN | 12 bits | AGN: ARQ Global Number |
| } | | |

TABLE ARQ.3

ARQ Fragmentation Sub-header Fields

| Name | Length | Description |
|---|---|---|
| FSF | 1 bit | Final or Sole Fragment<br>Indicates the fragmentation state of the MSDU<br>1 = final or sole fragment of the MSDU<br>0 = neither final nor sole fragment of the MSDU |
| ALN | 3 bits | ARQ Local Number<br>Indicates the local number (LN) of the first ARQ block in this fragment (or MSDU if not fragmented). The LN of a given ARQ block is the number of ARQ blocks preceding that ARQ block within the MSDU containing that ARQ block |

TABLE ARQ.3-continued

ARQ Fragmentation Sub-header Fields

| Name | Length | Description |
|---|---|---|
| AGN | 12 bits | ARQ Global Number<br>Indicates the global number (GN) of the first ARQ block in this fragment (or MSDU if not fragmented). The GN of a given ARQ block is the number of ARQ blocks preceding that ARQ block over the same CID, subject to the wraparound at the maximum value of the field (4095). |

Figure 3:
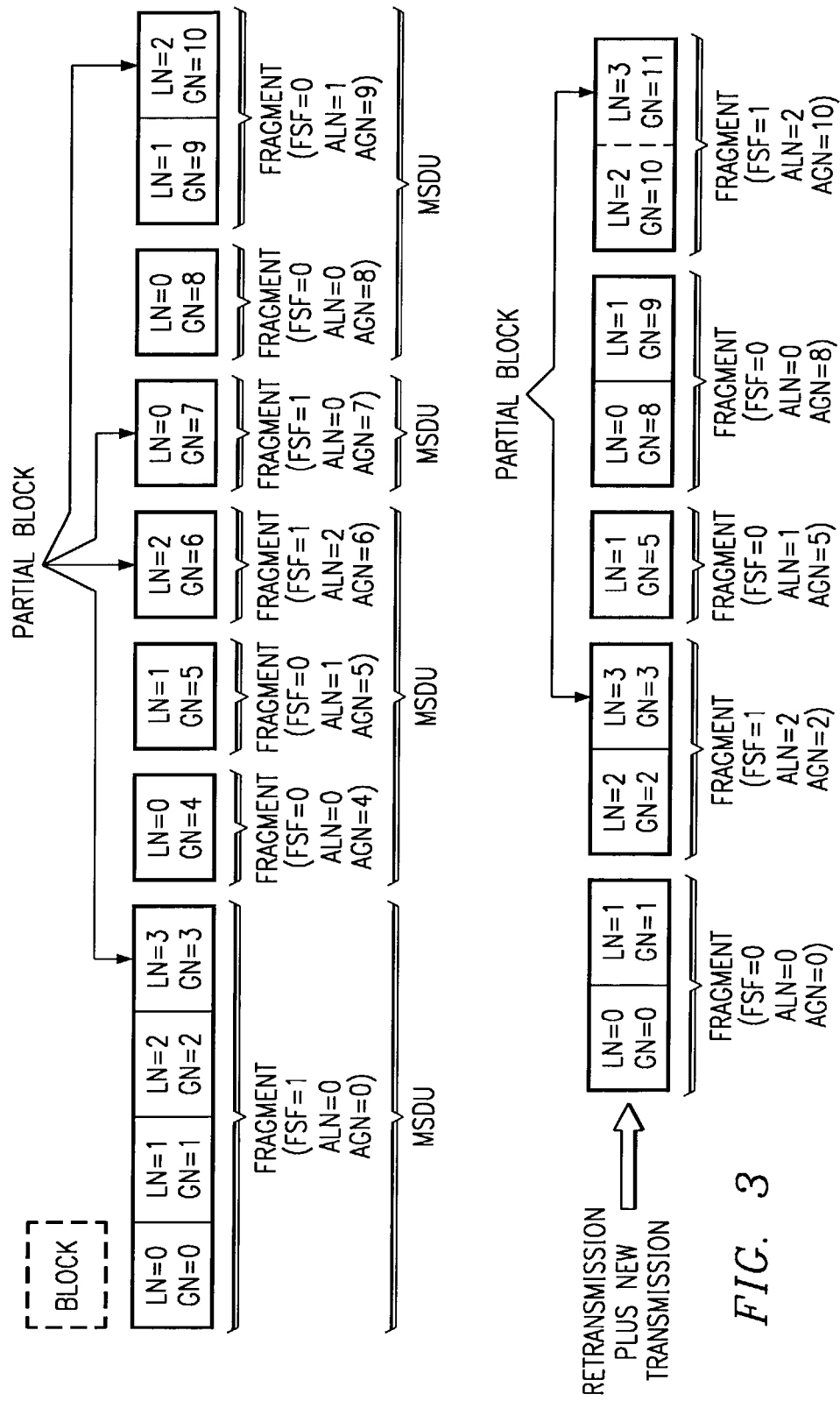
FIG. 3 illustrates ARQ blocks, fragments, MSDUs, and ARQ fragmentation headers.

FIG. 3 illustrates the relationships between ARQ blocks, MSDU fragments, and MSDUs. If an MSDU is smaller than an ARQ block in size, it is counted as an ARQ block and referred to as a partial ARQ block. Otherwise, it is partitioned into multiple ARQ blocks for numbering purposes, where only the final ARQ block may be a partial ARQ block (which is also counted as an ARQ block).

An MSDU, or a fragment thereof, if transmitted as an MPDU and requiring acknowledgment, shall contain an ARQ fragmentation header following the generic MAC header, with the ALN and AGN values equal to the LN and GN values of the first ARQ block of the MPDU (shown in bold print in FIG. 3). Fragmentation of an MSDU, or a fragment thereof, shall occur along ARQ block boundaries. With an ARQ fragmentation header, a new fragment may be constructed from ARQ blocks of consecutive GN values belonging in the same MSDU; some of those ARQ blocks may have never been transmitted while others may have been transmitted as part of one or more previous fragments but require retransmission. During this refragmentation process the LN and GN values of a given ARQ block shall remain unchanged, while the ALN and AGN values adjust with the first ARQ block in a new fragment. The fragments may be of different sizes, but, except the very last one of the MSDU, shall have an integer number of full ARQ blocks. All other subheaders (i.e., Grant management subheader and/or ARQ acknowledgment subheader) precede the ARQ fragmentation subheader when collocated in the same MPDU.

A received fragment with the FSF bit set to 1 indicates the end of the current MSDU. Whether or not such a frame is received, the receipt of a fragment with an ALN value equal to or smaller than the ALN value contained in the last received fragment signals the arrival of a new MSDU. A received fragment with an ALN value larger than the ALN value contained in the last received fragment belongs to the same MSDU if the difference between the two ALN values is the same as the difference (modulo 4096) between the two corresponding AGN values, and to another MSDU otherwise. This rule may be used in determining the fragmentation status of received MAC frames, in cases where intervening fragments are lost. In FIG. 3, the fragment with ALN=2 and AGN=6 is determined to belong in the same MSDU as the fragment with ALN=0 and AGN=4, even if the fragment with ALN=1 and AGN=5 is not received. On the other hand, the fragment with ALN=1 and AGN=9 is seen to belong in a different MSDU than the fragment with ALN=0 and AGN=7, even if the fragment with ALN=0 and AGN=8 is not received.

If the type 0x04 Fragmentation subheader as defined in Tables 4 and 5 of P802.16/D4 were used, the loss of two consecutive fragments as illustrated below would result in the following ambiguity, thus preventing the receiver from correctly determining whether another MSDU has already started and hence from correctly assembling the received fragments or timely passing them up to the higher layer.

Fragment(FC=10 or 11)Fragment(lost)Fragment(lost)
    Fragment (FC=11)

The two lost fragments may have FC=11 and FC=11, in which case the current MSDU is not completed yet, or FC=01 and FC=10, in which case another MSDU has already started.

TABLE ARQ.4

ARQ Packing Sub-Header Format

| Syntax | Size | Notes |
|---|---|---|
| ARQ packing sub-header (){ | | |
| FSF | 1 bit | FSF: Final or Sole Fragment |
| ALN | 3 bits | ALN: ARQ Local Number |
| AGN | 12 bits | AGN: ARQ Global Number |
| Reserved | 4 bits | |
| PFL | 12 bits | |
| } | | |

TABLE ARQ.5

ARQ Packing Sub-Header Fields

| Name | Length | Description |
|---|---|---|
| FSF | 1 bit | Final or Sole Fragment<br>Indicates the fragmentation state of the MSDU<br>1 = final or sole fragment of the MSDU<br>0 = neither final nor sole fragment of the MSDU |
| ALN | 3 bits | ARQ Local Number<br>Indicates the local number (LN) of the first ARQ block in this fragment (Or MSDU if not fragmented). The LN of a given ARQ block is the number of ARQ blocks preceding that ARQ block within the MSDU containing that ARQ block |
| AGN | 12 bits | ARQ Global Number<br>Indicates the global number (GN) of the first ARQ block in this fragment (or MSDU if not fragmented). The GN of a given ARQ block is the number of ARQ blocks preceding that ARQ block over the same CID, subject to the wraparound at the maximum value of the field (4095). |
| PFL | 12 bits | Packed Fragment Length<br>Indicates the length, in bytes, of the packed MSDU or MSDU fragment, including the four-byte packing subheader. |

Figure 4:
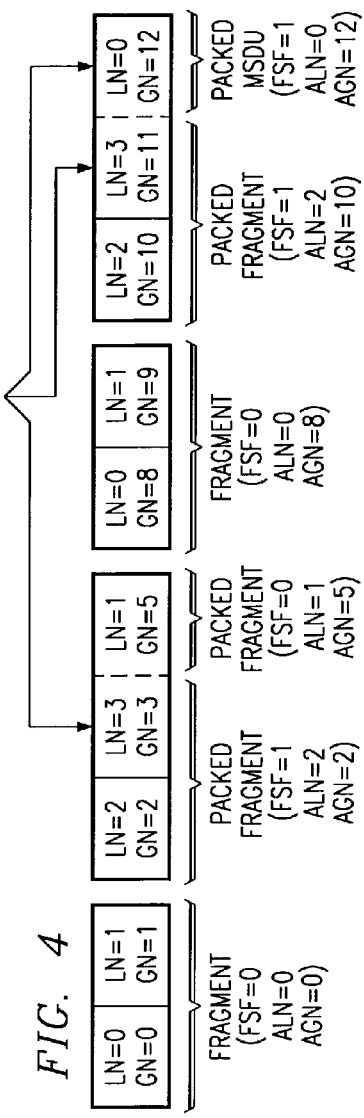
FIG. 4 illustrates MPDUs and ARQ packing headers.

ARQ packing subheaders further expand the framing functionality of ARQ fragmentation subheaders to allow for transmission as a single MPDU of ARQ blocks that are not of consecutive GN values or not part of the same MSDU, but are associated with the same connection identifier (CID). Frames constructed using ARQ fragmentation subheaders only as shown at the bottom of FIG. 3 may be reorganized with the use of ARQ packing subheaders as shown in FIG. 4, where a double dashed line denotes presence of an ARQ packing subheader. All other subheaders (i.e., Grant management subheader and/or ARQ acknowledgment subheader) precede the first ARQ packing subheader when collocated in the same MPDU.

TABLE ARQ.6

ARQ Acknowledgment Sub-Header Format

| Syntax | Size | Notes |
|---|---|---|
| ARQ acknowledgment sub-header | | |
| CID | 16 bits | CID: Connection ID |
| SHL | 4 bits | SHL: Subheader Length |
| GN | 12 bits | GN: Global Number |
| If (SHL>2) { | | |
| For (I=3; <SHL; i++){ | | |
|   AG | 1 bit | AG: Another GN |
|   If (AG=1) { | | |
|     GN | 12 bits | |
|     BM | 3 bits | BM: Bit Map |
|   } | | |
|   Else { | | |
|     BM | 15 bits | |
|     } | | |
|   } | | |
| } | | |
| } | | |

TABLE ARQ.7

| | | |
|---|---|---|
| CID | 16 bits | Indicates the CID for which the ARQ acknowledgment is generated. |
| SHL | 4 bits | Indicates the length, in units of 16 bytes, of this sub-header, with a minimum value of 2. |
| GN | 12 bits | Indicates the GN of a received ARQ block. |
| AG | 1 bit | Indicates if the remaining 15 bits of this two-byte sub-field specifies another GN plus a 3-bit map or contains a 15-bit bit map based on the preceding GN |
| BM | 3 or 15 bits | Indicates the bit map of the reception status of the ARQ blocks sequentially following the ARQ block identified by the preceding GN or BM, with a 0 value for an unsuccessful reception and a 1 for a successful reception of the corresponding ARQ block. |

All GNs indicated in a given ARQ acknowledgment subheaders; either explicitly by the GN fields or implicitly by the BM fields refer to the ARQ blocks sent over the same CID as also indicated in that subheader. Different ARQ acknowledgment subheaders may contain different CIDs, even when they are allowed to appear in the same MPDU.

Figure 5:
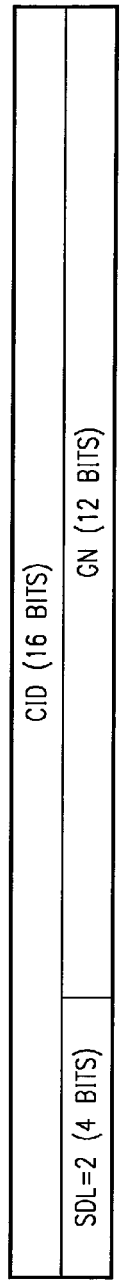
FIG. 5 illustrates a first example ARQ acknowledgment subheader.
Figure 6:
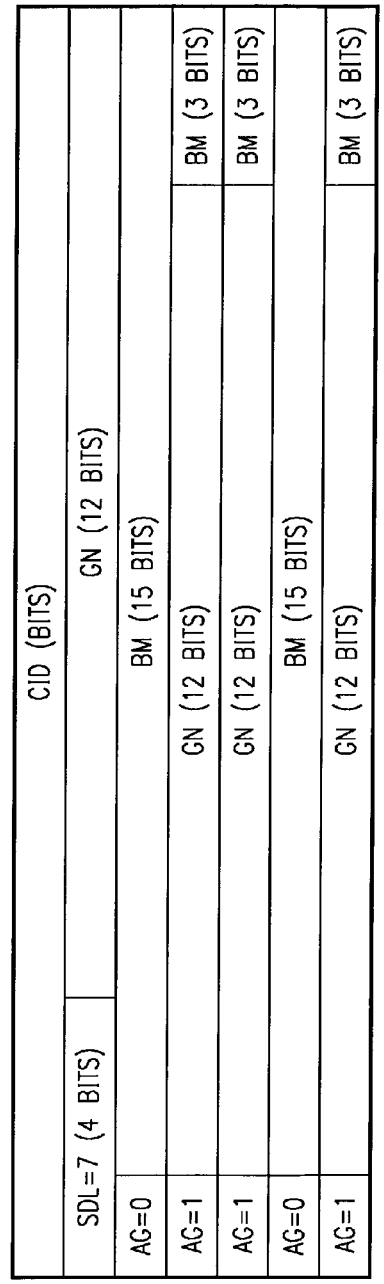
FIG. 6 illustrates a second example ARQ acknowledgment subheader.

FIGS. 5 and 6 illustrate two example ARQ acknowledgment subheaders. FIG. 5 illustrates a first acknowledgment subheader that furnishes a positive acknowledgment to an ARQ block identified by the sole GN field therein. FIG. 6 illustrates the second subheader provides 1) a positive acknowledgment to an ARQ block identified by the first GN field, and a positive or negative acknowledgment to the following 15 ARQ blocks of consecutive GN values via the first BM field; 2) a positive acknowledgment to an ARQ block identified by the second GN field, and a positive or negative acknowledgment to the following three ARQ blocks of consecutive GN values via the second BM field; 3) a positive acknowledgment to an ARQ block identified by the third GN field, and a positive or negative acknowledgment to the following 18 ARQ blocks of consecutive GN values via the third and fourth BM fields; 4) a positive acknowledgment to an ARQ block identified by the fourth GN field, and a positive or negative acknowledgment to the following three ARQ blocks of consecutive GN values via the fifth BM field.

ARQ Parameters

Figure 7:
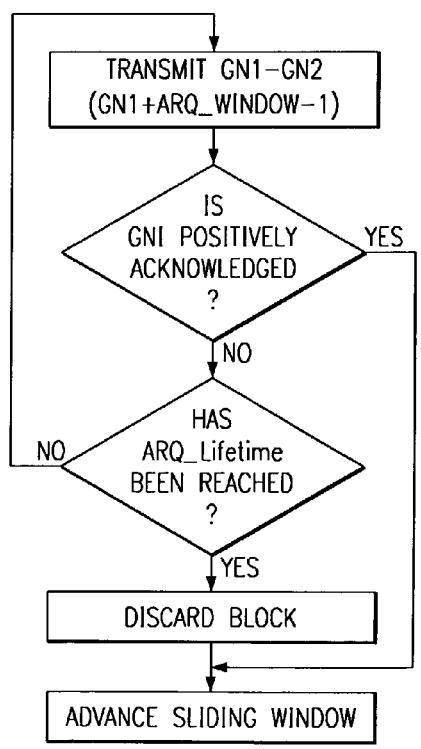
FIG. 7 illustrates operation of sliding window and ARQ-Lifetime.

The ARQ parameters are $ARQ_{13}$ Blocksize, ARQ_Window, ARQ_Timeout, and ARQ_Lifetime. See FIG. 7. These parameters assume on some default values, but may be redefined on a per CID basis at the time the connection identified by that CID is created or changed.

$ARQ_{13}$ Blocksize specifies the size of an ARQ block. It shall not be smaller than the quotient, rounded up to the next higher integer if not an integer, of the maximum MSDU size in bytes divided by eight. An MSDU, or its final ARQ block, may be smaller than ARQ_Blocksize, but is counted as an ARQ block for numbering purposes.

ARQ_Window specifies the maximum number of ARQ blocks a transmitter may transmit over the CID to which this parameter applies, counting consecutively from the ARQ block of the smallest GN value not yet positively acknowledged and circularly around 4095. It shall not be smaller than one nor larger than 4096. For instance, for an ARQ_Window of 5 ARQ blocks, if ARQ block 4094 (i.e., GN=4094) is the ARQ block for which a positive acknowledgment has not yet been received, but all the ARQ blocks of smaller GN values have been acknowledged positively, then only ARQ blocks 4095, 0, 1, 2 may be transmitted prior to the reception of a positive acknowledgment for ARQ block 4094, even after the later four ARQ blocks have been transmitted and positively acknowledged, unless ARQ block 4094 has reached its ARQ lifetime as defined below.

ARQ_Timeout specifies the minimum time interval a transmitter shall wait before retransmitting an unacknowledged ARQ block since the last transmission of that ARQ block. For instance, for an ARQ_Timeout of 10 ms, a retransmission of an ARQ block for which no acknowledgment has been received shall not take place within 10 ms of the previous transmission of that ARQ block.

ARQ_Lifetime specifies the maximum time interval beyond which a transmitter shall discard an ARQ block not yet positively acknowledged, measuring from the first transmission of that ARQ block. It is also used as the maximum time interval a receiver shall wait for missing ARQ blocks of smaller GN values (in modulo 4096 sense) before passing up a received ARQ block of larger GN value to the higher layer since the reception of that block. The value of ARQ_Lifetime shall not be smaller than the value of ARQ_Timeout. For instance, for an ARQ_Lifetime of 20 ms, an ARQ block shall be discarded if no positive acknowledgment has been received within 20 ms of its first transmission; an ARQ block shall be passed up to the higher layer within 20 ms of its reception, even if some ARQ blocks of smaller GN values have not been received. With this parameter, a transmitter avoids an endless retransmission of an ARQ block for which the receiver is not to return an acknowledgment for some reasons, so that the transmitter can proceed to transmit other buffered ARQ blocks; the receiver also avoids sending endless negative acknowledgments for an ARQ block which the transmitter has already discarded due to some other time-out mechanisms, and thus avoids excessively delaying the delivery of received ARQ blocks to the higher layer.

Transmitter

A station may transmit ARQ blocks whose GN values fall within the sliding windows pertaining to the corresponding CIDs over which the ARQ blocks are to be sent. The sliding window for a given CID spans consecutive GN values starting at GN1 and ending at GN2, where GN1 is the smallest GN value (circular around 4095) of the ARQ blocks sent over that CID but not yet positively acknowledged, and GN2=(GN1+ARQ_Window−1) modulo 4096, with the ARQ_Window relating to that CID. Whenever the ARQ block corresponding to the starting value of the sliding window is acknowledged positively, the sliding window is advanced (in a circular fashion around 4095) such that its starting value equals the next higher GN value, within the current sliding window, of ARQ blocks not yet positively acknowledged. An ARQ block is acknowledged positively when the transmitting station receives a positive acknowledgment for that ARQ block. An ARQ block is not acknowledged so long as the transmitting station has not received an acknowledgment for it, which may or may not have been sent by the receiving station. However, for the purpose of advancing the sliding window, an ARQ block is considered to have been acknowledged positively when it reaches its ARQ lifetime, i.e., when a time interval of ARQ_Lifetime defined for the connection of that ARQ block has elapsed since the first transmission of that ARQ block, even if the transmitter has not received a positive acknowledgment for it.

A station may retransmit an ARQ block after receiving a negative acknowledgment for that ARQ block, or after waiting for ARQ_Timeout defined for the connection of that ARQ block since the last transmission of that ARQ block if no acknowledgment is received yet for that ARQ block. A station may retransmit an ARQ block, even prior to receipt of an acknowledgment for the ARQ block, if the station is not being allowed to transmit new ARQ blocks due to the ARQ_Window constraints.

A station shall discard an ARQ block not yet positively acknowledged no later than the ARQ block reaches its ARQ Lifetime. A station shall ignore any positive or negative acknowledgment for an ARQ block that has been discarded.

Receiver

A station shall pass up a received MSDU for a given connection to the higher layer after all the same-connection ARQ blocks of GN values smaller than or equal to (circular around 4095) the largest GN value of the ARQ blocks comprising that MSDU have been received, but no later than ARQ-Lifetime from the reception of the earliest arrived ARQ block of that MSDU, even if some of the same-connection ARQ blocks whose GN values are smaller than the largest GN value implied in that MSDU have not been received. A station shall discard received ARQ blocks of GN values smaller than the GN value of the last ARQ block passed up for the same CID to the higher layer.

A station shall not acknowledge, positively or negatively, ARQ blocks with GN values at least ARQ_Window smaller than (circular around 4095) the largest GN value of the ARQ blocks received. Such not-to-acknowledge ARQ blocks are considered to have been received for the purpose of passing up ARQ blocks of larger GN values.

A station shall include only such ARQ acknowledgment subheaders in an MPDU that the CIDs contained in those subheaders refer to connections opposite to the connection identified by the CID contained in the generic MAC header of that MPDU. Subject to this constraint, a station shall include no more than one ARQ acknowledgment subheader in an MPDU containing one or more MSDU fragments. A station may include multiple ARQ acknowledgment subheaders with identical or different CIDs in a single MPDU not containing any MSDU or MSDU fragment. A station should attempt to transmit pending ARQ acknowledgment subheaders prior to, or in concurrence with, the MAC payload transmission.

Although the present invention and its advantages have been described in detail, it should be understood that various changes, substitutions and alterations can be made herein without departing from the spirit and scope of the invention as defined by the appended claims.

The invention claimed is:

1. A method of providing an automatic repeat request (ARQ) that employs a selective repeat, enabling a transmitting medium access control (MAC) entity at a transmitting station to retransmit those MAC data whose previous transmissions have failed by the steps of:

organizing MAC data into fixed-sized ARQ blocks, with said ARQ blocks being the building blocks of MAC service data units (MSDUs) or MSDU fragments;

said transmitting MAC entity assigning a local number and a global number to each ARQ block to be transmitted and identifying ARQ blocks contained in a transmitted MAC protocol data unit (MPDU) by including into the MPDU the local and global numbers of the first ARQ block in that MPDU;

and a receiving MAC entity at the receiving station determining, and acknowledging, the reception status of the ARQ blocks received or anticipated.

2. The method of claim 1 wherein said receiving MAC entity piggybacking the acknowledgment into other data going to the transmitting station or sending the acknowledgment alone back to the transmitting station.

3. The method of claim 1 wherein said local number is local to the ARQ blocks within a transmitted MSDU and said global number is global to the ARQ blocks across all transmitted MSDUs.

4. The method of claim 1 wherein said fragments are of variable lengths and constructed out of adjacent ARQ blocks.

5. The method of claim 1 wherein said fragment needs to include expressively only the local number and the global number of the first ARQ block in it for identification of all the ARQ blocks in it.

6. The method of claim 1 wherein said acknowledging step is provided in a single MPDU that also contains payload data.

7. The method of claim 1 wherein said acknowledging step is provided in a single MPDU for ARQ blocks of consecutive global numbers.

8. The method of claim 1 wherein said acknowledging step is provided in a single MPDU for ARQ blocks of non-consecutive global numbers.

9. The method of claim 1 wherein said acknowledging step is provided in a single MPDU for ARQ blocks via a global number field contained in that MPDU.

10. The method of claim 1 wherein said acknowledging step is provided in a single MPDU for ARQ blocks via a global number field and a bitmap field, both the global number field and the bitmap field being contained in that MPDU.

11. The method of claim 1 wherein said acknowledging step is provided in a single MPDU for ARQ blocks via a plurality of global number fields and a plurality of bitmap fields, all of these fields being contained in that MPDU.

12. The method of claim 1 wherein the maximum number of ARQ blocks which a MAC entity may transmit or receive and which sets the buffer limits over a connection identifier (CID) is provided by a sliding window.

13. The method of claim 1 wherein said transmitting MAC entity must wait a minimum time interval before retransmitting an unacknowledged ARQ block since a first transmission of that ARQ block.

14. The method of claim 1 wherein said transmitting MAC entity discards an ARQ block not positively acknowledged after a predetermined time interval has elapsed since a first transmission of that ARQ block.

15. The method of claim 1 wherein said receiving MAC entity passes up a received MSDU to a higher layer after receiving all the ARQ blocks comprising that MSDU, and within a predetermined time interval of receiving the first ARQ block in that MSDU.

16. A system for providing an automatic repeat request (ARQ) that employs a selective repeat comprising, in combination:
 a transmitting station having a transmitting medium access control (MAC) entity to retransmit those MAC data whose previous transmissions have failed by the MAC data organized into fixed-sized ARQ blocks, with said ARQ blocks being the building blocks of MAC service data units (MSDUs) or MSDU fragments;
 said transmitting MAC entity assigning a local number and a global number to each ARQ block to be transmitted and identifying ARQ blocks contained in a transmitted MAC protocol data unit (MPDU) by including into the MPDU the local and global numbers of the first ARQ block in that MPDU;
 and a receiving station having a receiving MAC entity determining, and acknowledging, the reception status of the ARQ blocks received or anticipated.

17. The system of claim 16 wherein said receiving MAC entity piggybacks the acknowledgment into other data going to the transmitting station or sending the acknowledgment alone back to the transmitting station.

18. The system of claim 16 wherein said local number is local to the ARQ blocks within a transmitted MSDU and said global number is global to the ARQ blocks across all transmitted MSDUs.

19. The system of claim 16 wherein said fragments are of variable lengths and constructed out of adjacent ARQ blocks.

20. The system of claim 16 wherein said fragment needs to include expressively only the local number and the global number of the first ARQ block in it for identification of all the ARQ blocks in it.

21. The system of claim 16 wherein said acknowledging step is provided in a single MPDU that also contains payload data.

22. The system of claim 16 wherein said acknowledging step is provided in a single MPDU for ARQ blocks of consecutive global numbers.

23. The system of claim 16 wherein said acknowledging step is provided in a single MPDU for ARQ blocks of non-consecutive global numbers.

24. The system of claim 16 wherein said acknowledging step is provided in a single MPDU for ARQ blocks via a global number field contained in that MPDU.

25. The system of claim 16 wherein said acknowledging step is provided in a single MPDU for ARQ blocks via a global number field and a bitmap field, both the global number field and the bitmap field being contained in that MPDU.

26. The system of claim 16 wherein the maximum number of ARQ blocks which a MAC entity may transmit or receive and which sets the buffer limits over a connection identifier (CID) is provided by a sliding window.

27. The system of claim 16 wherein said transmitting MAC entity must wait a minimum time interval before retransmitting an unacknowledged ARQ block since a first transmission of that ARQ block.

28. The system of claim 16 wherein said transmitting MAC entity discards an ARQ block not positively acknowledged after a predetermined time interval has elapsed since a first transmission of that ARQ block.

29. The system of claim 16 wherein said receiving MAC entity passes up a received MSDU to a higher layer after receiving all the ARQ blocks comprising that MSDU, and within a predetermined time interval of receiving the first ARQ block in that MSDU.

30. The system of claim 16 wherein said acknowledging step is provided in a single MPDU for ARQ blocks via a plurality of global number fields and a plurality of bitmap fields, all of these fields being contained in that MPDU.

* * * * *